United States Patent

Woods

[11] Patent Number: 6,054,200
[45] Date of Patent: Apr. 25, 2000

[54] METHOD OF MANUFACTURING MULTI-STRENGTH HONEYCOMB CORE WITHOUT SPLICING AND A STRUCTURE MANUFACTURED FROM THE MULTI-STRENGTH HONEYCOMB CORE

[75] Inventor: Robert F. Woods, Havre De Grace, Md.

[73] Assignee: Alcore, Inc., Belcamp, Md.

[21] Appl. No.: 08/957,819

[22] Filed: Oct. 27, 1997

[51] Int. Cl.[7] ............................................. B32B 17/00

[52] U.S. Cl. ............................ 428/116; 428/118; 156/197

[58] Field of Search ............................... 428/116, 118; 156/197

[56] References Cited

U.S. PATENT DOCUMENTS

| | | | |
|---|---|---|---|
| 3,887,418 | 6/1975 | Jurisich | 428/118 X |
| 4,336,090 | 6/1982 | Hilton | 428/116 X |
| 4,550,046 | 10/1985 | Miller | 428/116 |
| 5,106,668 | 4/1992 | Turner et al. | 428/116 |
| 5,460,865 | 10/1995 | Tsotsis | 428/116 |
| 5,747,123 | 5/1998 | Fritzman | 428/116 X |

*Primary Examiner*—Timothy M. Speer
*Attorney, Agent, or Firm*—Oblon, Spivak, McClelland, Maier & Neustadt, P.C.

[57] ABSTRACT

A method of manufacturing a multi-strength honeycomb core and a multi-strength honeycomb stricture produced form the multi-strength honeycomb core. The method includes the steps of (a) stacking first layers of a first thickness with adhesive at a first adhesive spacing to produce a first honeycomb core having a first density and (b) stacking second layers of a second thickness with adhesive at a second adhesive spacing onto the first honeycomb core to produce a second honeycomb core having a second density stacked on top of the first honeycomb core. The method may also include the step of (c) stacking third layers of a third thickness with adhesive at a third adhesive spacing onto one of the first and second honeycomb cores to produce a third honeycomb core having a third density stacked on top of one of the first and second honeycomb cores. Alternatively, the method of manufacturing a multi-strength honeycomb core includes the steps of (a) removing a top protective layer from a first honeycomb core having layers of a first thickness and adhesive at a first adhesive spacing and (b) bonding a second honeycomb core having layers of a second thickness and adhesive at a second adhesive spacing onto the first honeycomb core to produce the second honeycomb core of a second density stacked on top of the first honeycomb core of a first density. The method may also include the steps of (c) removing a protective layer from one of the first and second honeycomb cores and (d) bonding a third honeycomb core having layers of a third thickness and adhesive at a third adhesive spacing onto one of the first and second honeycomb cores to produce the third honeycomb core of a third density stacked on top of one of the first and second honeycomb cores of respective first and second densities. The multi-strength honeycomb core may be cured, as required, in one press cycle, machined, and/or expanded to produce a multi-strength honeycomb structure.

36 Claims, 5 Drawing Sheets

METHOD OF MANUFACTURING MULTI-STRENGTH HONEYCOMB CORE WITHOUT SPLICING AND A STRUCTURE MANUFACTURED FROM THE MULTI-STRENGTH HONEYCOMB CORE

CROSS REFERENCES TO RELATED APPLICATIONS

This application is related to U.S. patent application Ser. No. 08/957,862 Attorney Docket Number 9465-0002-25, by Moorehouse et al entitled "METHOD AND APPARATUS FOR CLAMP ASSISTED BONDING OF HONEYCOMB CORE COMPONENTS," filed on Oct. 27, 1997, and incorporated herein by reference.

BACKGROUND OF THE INVENTION

1. Field of the Invention

The present invention relates to a method of manufacturing multi-strength honeycomb core without splicing and to a multi-strength honeycomb structure produced with the multi-strength honeycomb core.

2. Discussion of Background

In recent years, honeycomb core structures have been used for fabricating various devices, such as aircraft structures, vehicle structures, etc. Honeycomb core is produced with varying cell size, density, material, cell configuration, and surface treatments. Honeycomb core is a structural material that combines strength improvement with weight reduction and unique structural advantages, and therefore it is typically used as a light density filler material for aerospace applications. Thin metallic or composite skins are bonded to the surface of the core to make structures with very high stiffness and low weight.

A primary criterion in aerospace design is weight minimization. As a result, aerospace designers often design components with different densities of honeycomb core splice bonded together. Heavy density core details are used in regions where loading is high or fasteners are used. Conversely, low density core is used in regions with lower strength requirements. For example, high-density honeycomb is used for edge reinforcement and fastener inserts in lower density honeycomb structures.

Honeycomb core may be made from various metallic and non-metallic materials, including aluminum, paper, fiberglass, etc., depending on a given application, and it is available in CUE (Core UnExpanded) blocks, CUE slices (cut to specific thickness), and expanded panels. Honeycomb can be machined for inserts, tapers, or contours, for doubler areas, for edge bevels, for periphery cuts, and for adhesive foam splicing. However, since in many of the above-described applications various density honeycomb cores must be mated to provide areas of lower and higher density, manufacturing difficulties exist as will now be described with reference to FIGS. 1–5.

FIG. 1 illustrates a top view, looking down onto a honeycomb structure 100 having a first density core portion 110, a second density core portion 120, and a third density core portion 130. The three core portions 110–130 are joined together to form a single structure with splices S comprising adhesive joints.

In FIG. 2, a side view of the multi-density honeycomb structure 100 taken along line A—A of FIG. 1 is shown having an upper surface 140 and a lower surface 150 being, for example, contoured and flat surfaces, respectively. These surfaces must be typically machined so as to provide proper alignment between the various density core portions 110–130.

FIG. 3 shows a cross-sectional view taken along line B—B of FIG. 1. As shown in FIG. 3, a mismatch M may occur between, for example, the first density core portion 110 and the second density core portion 120 of the contour surface 140 at the splice S due to machining tolerances and movement of core portions 110 and 120 during the bonding.

FIG. 4 is used to illustrate the manufacturing steps of a honeycomb core 200. In FIG. 4, individual layers 230 are bonded with adhesive in a stacked fashion at locations 210 and 220 equally dispersed throughout the layers 230 at different intervals to form the honeycomb core 200. In FIG. 4, the honeycomb core 200 is shown in a compact or block state, also referred to as Core UnExpanded (CUE). While the core is in this state, machining operations (such as slicing, shaping, beveling, contour machining, etc.) are performed, and the CUE core is manufactured to a variety of cell configurations, thicknesses, lengths, and widths. The density of a CUE or expanded core is a product of the thickness of the individual layers and the adhesive spacing on each layer of the core and can be varied by changing the layer thickness and/or adhesive spacing.

FIG. 5 shows the honeycomb core 200 of the FIG. 4 in an expanded state. As shown in FIG. 5, a honeycomb cell 240 is defined by the bonds 210 and 220 and the layers 230. In order to manufacture a honeycomb core of a given density, a CUE core having layers 230 of a given thickness and adhesive bonds 210 and 220 with a given adhesive spacing are provided. The layers 230 and adhesive spacing are chosen so that, when the CUE core is expanded, a honeycomb core of a given density and corresponding strength results.

As previously described, two or more expanded core portions of different densities must be spliced or joined together with an adhesive foam/film to obtain a multi-strength honeycomb structure. The requirement designers impose on honeycomb core requiring splicing/bonding different types of core together poses some difficulties for the manufacturer.

First, it is critical that the adjacent details are bonded tightly together with each cell edge along the splice line penetrating the splice adhesive. Any gap between the core and the adhesive will appear as a void in subsequent non-destructive testing procedures deeming the assembly non-conforming. Additionally, the splice line must typically be equal to or greater in strength than the adjacent cores.

Second, the core is generally treated to enhance bond strength and inhibit corrosion. As a result, sanding or blending adjacent core details to achieve a flush condition at the splice lines is not permitted. To avoid the need to blend, the separate details must first be produced to close tolerance thickness requirements. Subsequently, the bonding operation must insure that the details are held tightly against the bond tool surface.

The general results of the manufacturing method described above are not conducive to obtaining a near perfect matched surface bond/spliced joint as previously discussed. The mismatched surfaces cause irregularities, for example, when a honeycomb structure has a laminated skin surface bonded to it in a complete assembly. Furthermore, the above-described process can result in moisture attraction and migration into the final bonded assembly, further degrading structural performance.

OBJECTS OF THE INVENTION

Accordingly, one object of the present invention is to provide a method of manufacturing a multi-strength honeycomb structure without use of splices.

Another object of the present invention to provide a method of manufacturing a multi-strength honeycomb structure with reduced moisture attraction and migration in the final bonded assembly.

A further object of the present invention is provide a method of manufacturing a multi-strength honeycomb structure without the need of splicing or joining of cores and with reduced manufacturing steps.

SUMMARY OF THE INVENTION

The above and other objects of the invention are achieved by providing a method of manufacturing a multi-strength honeycomb core including the steps of (a) stacking first layers of a first thickness with adhesive at a first adhesive spacing to produce a first honeycomb core having a first density and (b) stacking second layers of a second thickness with adhesive at a second adhesive spacing onto the first honeycomb core to produce a second honeycomb core having a second density stacked on top of the first honeycomb core. The method may also include the step of (c) stacking third layers of a third thickness with adhesive at a third adhesive spacing onto one of the first and second honeycomb cores to produce a third honeycomb core having a third density stacked on top of one of the first and second honeycomb cores.

In another aspect of the present invention, there is provided a method of manufacturing a multi-strength honeycomb core including the steps of (a) removing a top protective layer from a first honeycomb core having layers of a first thickness and adhesive at a first adhesive spacing and (b) bonding a second honeycomb core having layers of a second thickness and adhesive at a second adhesive spacing onto the first honeycomb core to produce the second honeycomb core of a second density stacked on top of the first honeycomb core of a first density. The method may also include the steps of (c) removing a protective layer from one of the first and second honeycomb cores and (d) bonding a third honeycomb core having layers of a third thickness and adhesive at a third adhesive spacing onto one of the first and second honeycomb cores to produce the third honeycomb core of a third density stacked on top of one of the first and second honeycomb cores of respective first and second densities.

In a further aspect of the present invention there is provided a continuous multi-strength honeycomb structure without splices including (a) a first honeycomb core portion having layers of a first thickness and adhesive at a first adhesive spacing and (b) a second honeycomb core portion having layers of a second thickness and adhesive at a second adhesive spacing and continuous with the first honeycomb core portion, wherein the first and second honeycomb core portions having respective first and second densities form a continuous multi-strength honeycomb structure without splices. The structure may further include (c) a third honeycomb core portion having layers of a third thickness and adhesive at a third adhesive spacing and continuous with one of the first and second honeycomb core portions, wherein the first, second, and third honeycomb core portions having respective first, second and third densities form a continuous multi-strength honeycomb structure without splices.

The multi-strength honeycomb core may be cured, as required, in one press cycle, machined, and/or expanded to produce a multi-strength honeycomb structure.

BRIEF DESCRIPTION OF THE DRAWINGS

A more complete appreciation of the invention and many of the attendant advantages thereof will be readily obtained as the same becomes better understood by reference to the following detailed descriptions when considered in connection with the accompanying drawings, wherein.

DETAILED DESCRIPTION OF THE PREFERRED EMBODIMENTS

Figure 6:
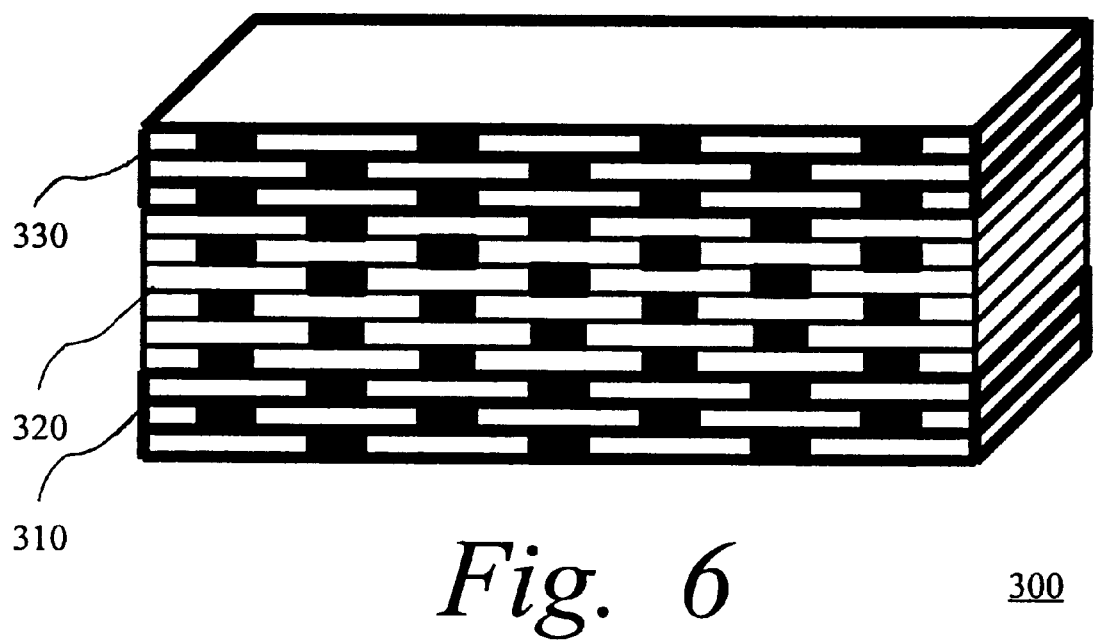
FIG. 6 is used to illustrate the manufacturing steps to produce a multi-strength honeycomb core in block form, according to the present invention.

Referring now to the drawings, wherein like reference numerals designate identical or corresponding parts throughout the several views, and more particularly to FIG. 6 thereof, there is illustrated a multi-strength honeycomb core 300 in a Core UnExpanded (CUE) state.

In FIG. 6, a first CUE core 310 having layers of a given thickness is stacked with adhesive at a given adhesive spacing using standard manufacturing processes to produce the CUE core 310 having a corresponding strength and density. The process continues with a second CUE core 320 having layers of a given thickness and with adhesive at a given adhesive spacing stacked directly onto the first CUE core 310. On top of the second CUE core 320 is stacked an additional CUE core 330 having layers of a given thickness and with adhesive at a given adhesive spacing. This process continues until as many CUE core layers as needed are produced. FIG. 6 shows, for example, a multi-strength core 300 having three CUE core layers 310–330 of various densities based on the various thicknesses and adhesive spacings of the CUE core layers 310–330. A suitable adhesive or bonding material, such as epoxy adhesive, etc., is provided at the given adhesive spacings to join the layers of the cores 310–330 and to provide a proper bond strength. The multi-strength honeycomb core 300 is then cured, as required, in one press cycle using standard manufacturing processes.

Figure 7:
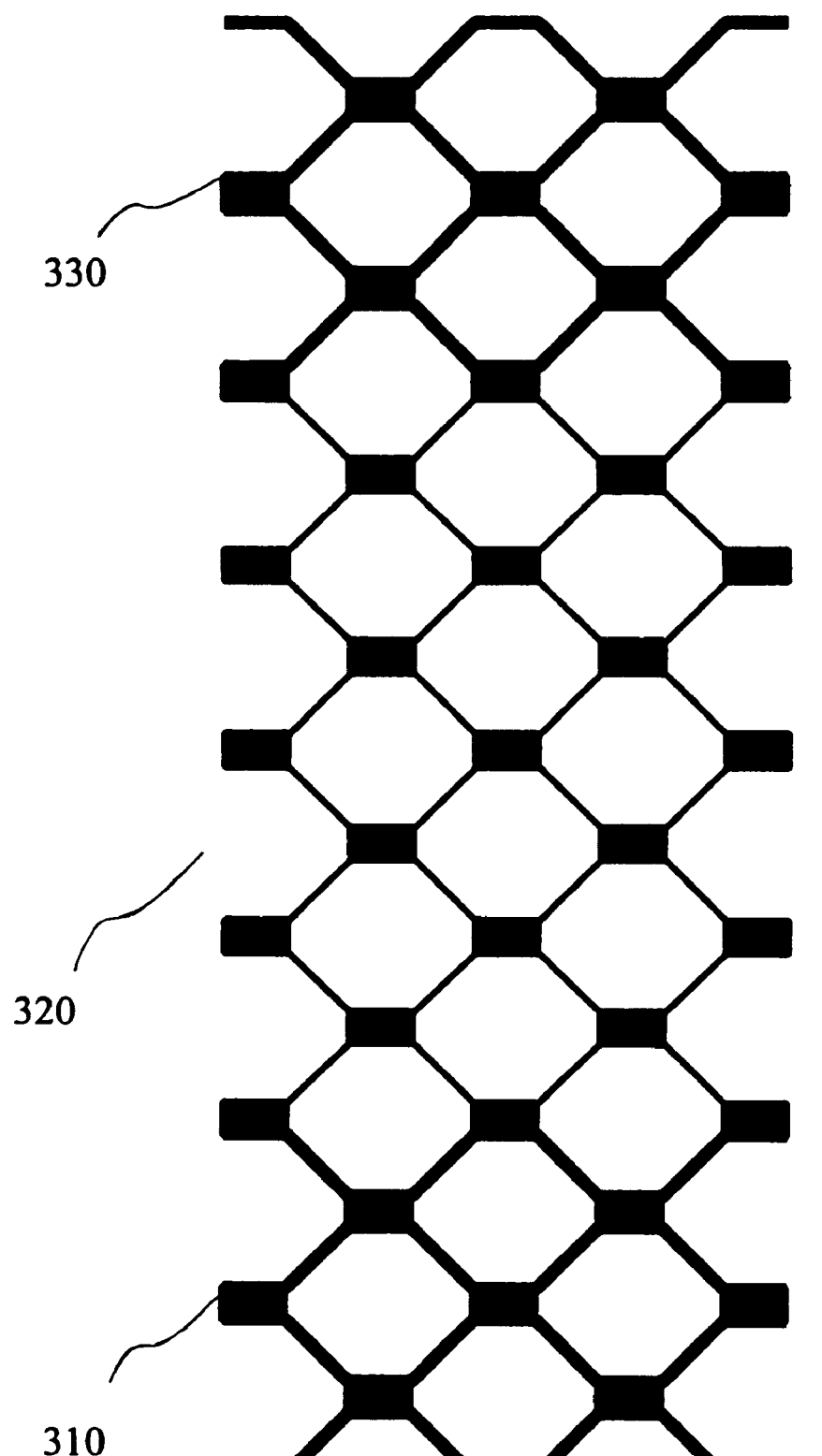
FIG. 7 shows the honeycomb core of FIG. 6 in an expanded state.

In FIG. 7, the multi-strength honeycomb core 300 in an expanded state is shown and includes honeycomb portions 310–330 corresponding to CUE cores 310–330 of FIG. 6. The materials used to produce the cores 310–330 can be various metallic and non-metallic materials, including aluminum, paper, fiberglass, etc., depending on strength requirements for a given application. In a preferred embodiment, the honeycomb portions 310 and 330 are made from 5052 aluminum alloy with a density of 4.4 lb/ft$^3$, a cell size measured across cell flats of ³⁄₁₆", and individual layer thicknesses of 0.0015". The honeycomb portion 320 is made from 5052 aluminum alloy with a density of 3.1 lb/ft$^3$, a cell size measured across cell flats of ³⁄₁₆", and individual layer thicknesses of 0.0010".

Figure 9:
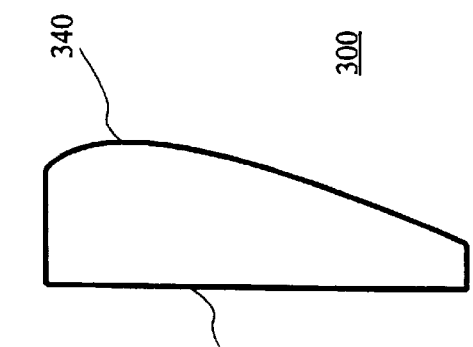
FIG. 9 is a side view taken along line C—C of FIG. 8 illustrating machined surfaces of the honeycomb structure.
Figure 8:
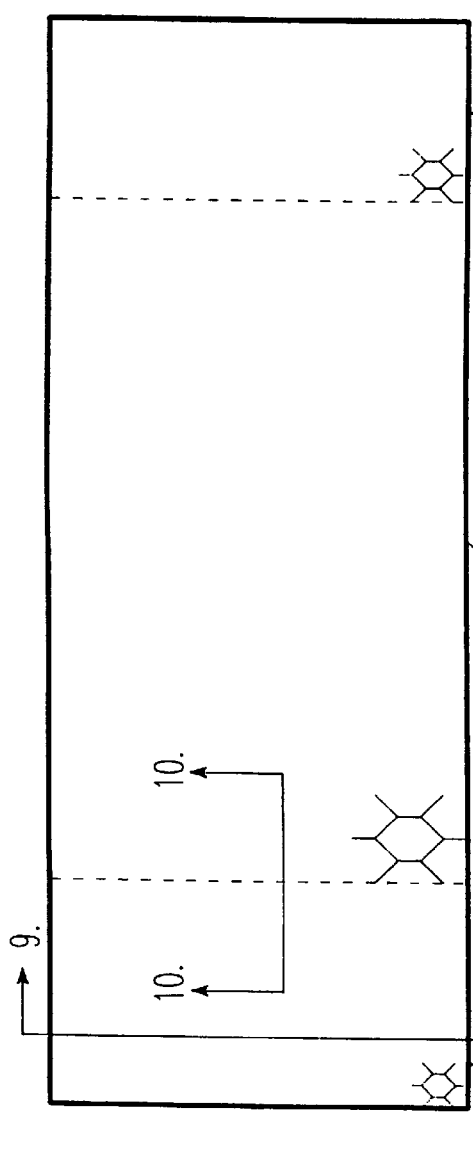
FIG. 8 is a top view of a multi-strength honeycomb structure made up of a single core of various densities produced without splicing, according to the present invention.
Figure 10:
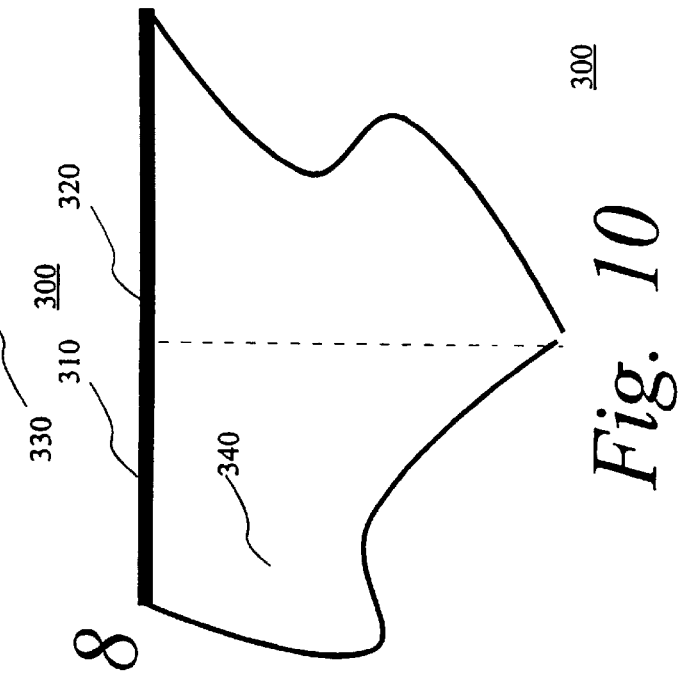
FIG. 10 is a cross-sectional view taken along line D—D of FIG. 8 showing that no mismatch occurs in the multi-strength honeycomb structure.

Once the multi-strength honeycomb core 300 is manufactured as shown in FIG. 6, the core 300 can be machined and expanded as illustrated in FIGS. 8–10.

FIG. 8 illustrates a top view looking down onto a multi-strength honeycomb core 300 having a first density core portion 310, a second density core portion 320, and a third density core portion 330. The three core portions 310–330 form a single structure without splices.

In FIG. 9, a side view of the multi-strength honeycomb core 300 taken along line C—C of FIG. 8 is shown having an upper surface 340 and a lower surface 350 being, for example, contoured and flat surfaces, respectively. These surfaces are machined onto the multi-strength honeycomb core 300 manufactured as described with respect to FIG. 6.

FIG. 10 shows a cross-sectional view taken along line D—D of FIG. 8. As shown in FIG. 10, no mismatch occurs between the first density core portion 310 and the second density core portion 320 of the upper surface 340 since the multi-strength honeycomb core 300 is manufactured as a continuous core as described with respect to FIG. 6.

Figure 1:
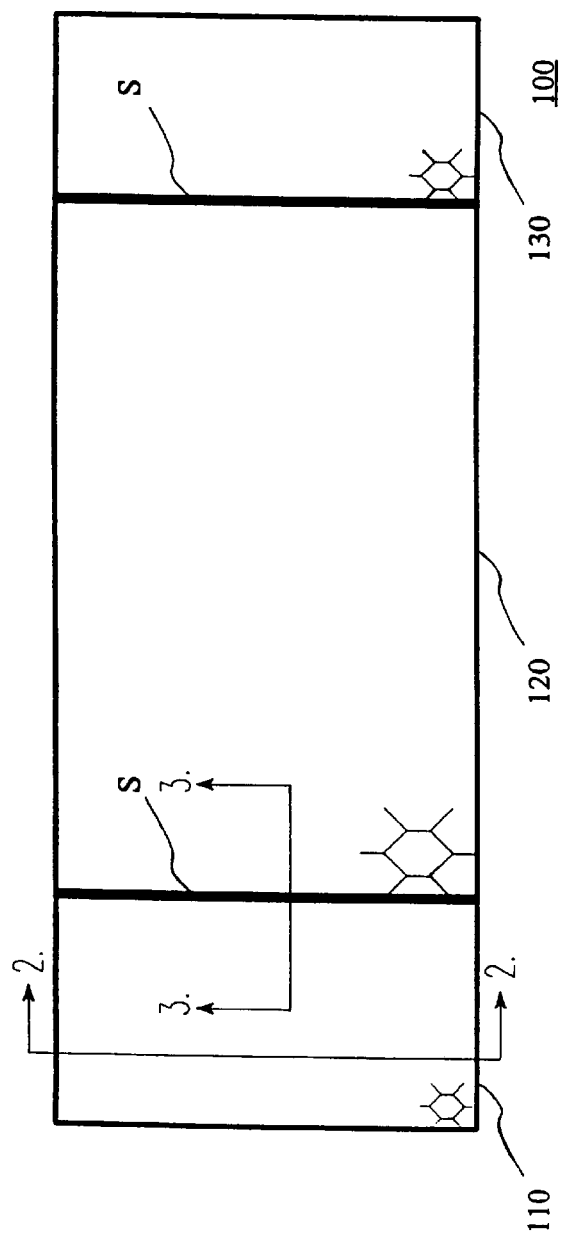
FIG. 1 is a top view of a multi-strength honeycomb structure made up of three cores portions of various densities.
Figure 2:
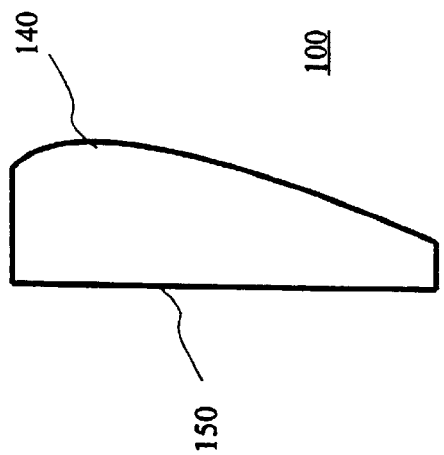
FIG. 2 is a side view taken along line A—A of FIG. 1 illustrating machined surfaces of the honeycomb structure.
Figure 3:
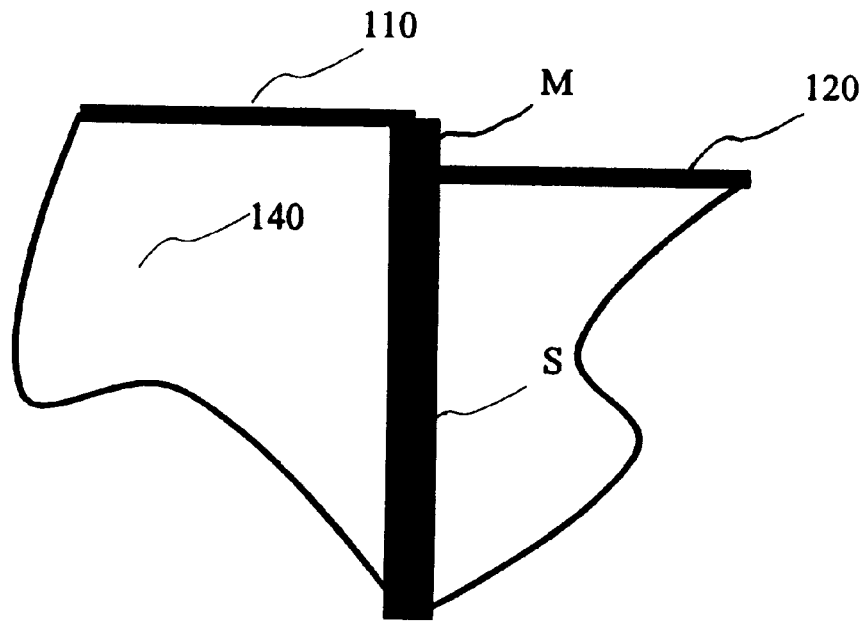
FIG. 3 is a cross-sectional view taken along line B—B of FIG. 1 showing a mismatch in the splice area of the multi-strength honeycomb structure.
Figure 4:
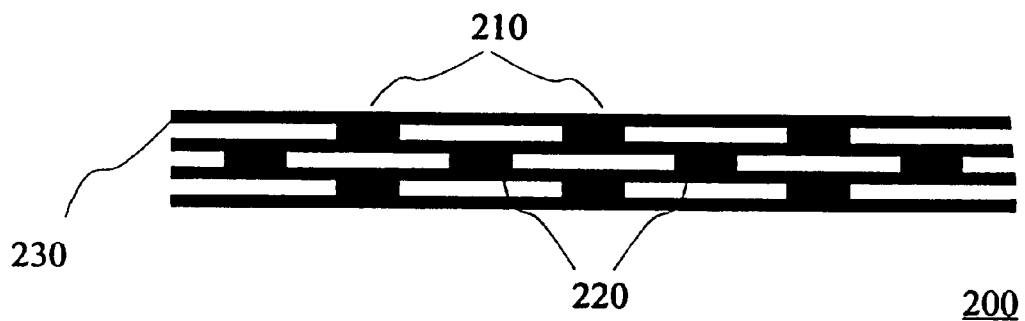
FIG. 4 is used to illustrate the manufacturing steps to produce a honeycomb core in a compact or block state.
Figure 5:
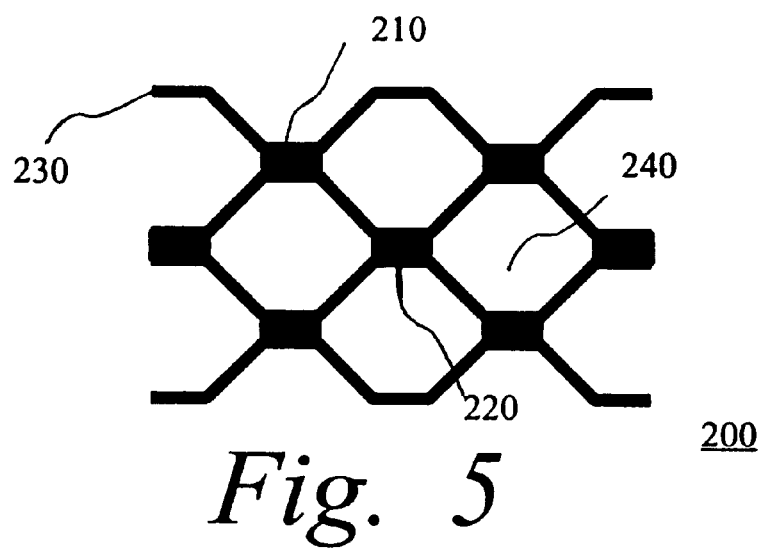
FIG. 5 shows the honeycomb core of FIG. 4 in an expanded state.

The machined multi-strength honeycomb core 300 having the upper surface 340 and the lower surface 350, does not include splices as are required in the structure shown in FIGS. 1 and 3. The multi-strength honeycomb core 300 is continuous and has portions 310–330 of varying density.

The present invention has been described in terms of providing a method of manufacturing a multi-strength honeycomb structure wherein cores having various densities are manufactured in sequential steps. However, the manufacturing process of the present invention could be adapted so that pre-manufactured CUE cores 310–330 of various densities, after removal of a top protective adhesive, are bonded together and then cured to form the multi-strength honeycomb core of FIG. 6.

Although, the present invention has been described in terms of providing a method of manufacturing a multi-strength honeycomb core having three honeycomb portions 310–330, a honeycomb core having various number of various density honeycomb portions could be manufactured based on the teachings of the present invention as will be apparent to those skilled in the art.

Although, the present invention has been described in terms of providing a method of manufacturing a multi-strength honeycomb core wherein the honeycomb portions 310 and 330 are made from 5052 aluminum alloy with a density of 4.4 lb/ft$^3$, a cell size measured across cell flats of ³⁄₁₆", and individual layer thicknesses of 0.0015", and the honeycomb portion 320 is made from 5052 aluminum alloy with a density of 3.1 lb/ft$^3$, a cell size measured across cell flats of ³⁄₁₆", and individual layer thicknesses of 0.0010", other various metallic and non-metallic materials, other densities, other cell sizes, and other individual layer thicknesses could be used as will be apparent to those skilled in the art.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of manufacturing a single non-spliced block of multi-strength honeycomb core, the method comprising the steps of:
   (a) stacking first layers of a first thickness flexible substrate with adhesive at a first adhesive spacing to produce a first density layer in an expansion direction and
   (b) stacking second layers of a second thickness flexible substrate with adhesive at a second adhesive spacing onto the first density layer in the expansion direction to produce a second density layer stacked on top of the first density layer.

2. The method of claim 1 further comprising the step of stacking third layers of a third thickness flexible substrate with adhesive at a third adhesive spacing onto one of the first and second density layers in the expansion direction to produce a third density layer stacked on top of one of the first and second density layers.

3. The method of claim 1, further comprising the step of curing the second density layer stacked on top of the first density layer.

4. The method of claim 2, further comprising the step of curing the third density layer stacked on top of one of the first and second density layers.

5. The method of claim 3, further comprising the step of machining the cured second honeycomb core stacked on top of the first honeycomb core.

6. The method of claim 4, further comprising the step of machining the cured third density layer stacked on top of one of the first and second density layers.

7. The method of claim 3, further comprising the step of expanding the cured second density layer stacked on top of the first density layer in the expansion direction.

8. The method of claim 4, further comprising the step of expanding the cured third density layer stacked on top of one of the first and second density layers in the expansion direction.

9. The method of claim 5, further comprising the step of expanding the machined second density layer stacked on top of the first density layer in the expansion direction.

10. The method of claim 6, further comprising the step of expanding the machined third density layer stacked on top of one of the first and second density layers in the expansion direction.

11. A method of manufacturing a single non-spliced block of multi-strength honeycomb core, the method comprising the steps of:
   (a) removing an outside substrate layer from a first honeycomb core having layers of a first thickness flexible substrate and adhesive at a first adhesive spacing and
   (b) bonding a second honeycomb core having layers of a second thickness flexible substrate and adhesive at a second adhesive spacing onto an area of the first honeycomb core where the outside layer is removed to produce the second honeycomb core of a second density stacked on top of the first honeycomb core of a first density,
   (c) wherein the first and second honeycomb cores are bonded so that the layers thereof are perpendicular to an expansion direction of the first and second honeycomb cores.

12. The method of claim 11, further comprising the steps of:

(a) removing an outside substrate layer from one of the first and second honeycomb cores and (b) bonding a third honeycomb core having layers of a third thickness flexible substrate and adhesive at a third adhesive spacing onto an area of one of the first and second honeycomb cores where the outside substrate layer is removed to produce the third honeycomb core of a third density stacked on top of one of the first and second honeycomb cores of respective first and second densities, (c) wherein the first, second, and third honeycomb cores are bonded so that the layers thereof are perpendicular to an expansion direction of the first, second and third honeycomb cores.

13. The method of claim 11, further comprising the step of curing the second honeycomb core stacked on top of the first honeycomb core.

14. The method of claim 12, further comprising the step of curing the third honeycomb core stacked on top of one of the first and second honeycomb cores.

15. The method of claim 13, further comprising the step of machining the cured second honeycomb core stacked on top of the first honeycomb core.

16. The method of claim 14, further comprising the step of machining the cured third honeycomb core stacked on top of one of the first and second honeycomb cores.

17. The method of claim 13, further comprising the step of expanding the cured second honeycomb core stacked on top of the first honeycomb core in the expansion direction.

18. The method of claim 14, further comprising the step of expanding the cured third honeycomb core stacked on top of one of the first and second honeycomb cores in the expansion direction.

19. The method of claim 15, further comprising the step of expanding the machined second honeycomb core stacked on top of the first honeycomb core in the expansion direction.

20. The method of claim 16, further comprising the step of expanding the machined third honeycomb core stacked on top of one of the first and second honeycomb cores in the expansion direction.

21. A continuous multi-strength honeycomb structure without splices, the structure comprising:

(a) a first density layer having layers of a first thickness flexible substrate and adhesive at a first adhesive spacing and (b) a second density layer having layers of a second thickness flexible substrate and adhesive at a second adhesive spacing and continuous with the first density layer, (c) wherein:
(i) the first and second density layers having respective first and second densities form a continuous multi-strength honeycomb structure without splices and
(ii) the layers of the first and second density layers are perpendicular to an expansion direction thereof.

22. The structure of claim 21:
(a) further comprising a third density layer having layers of a third thickness flexible substrate and adhesive at a third adhesive spacing and continuous with one of the first and second density layers,
(b) wherein:
(i) the first, second, and third density layers having respective first, second and third densities form a continuous multi-strength honeycomb structure without splices and
(ii) the layers of the first, second and third density layers are perpendicular to an expansion direction thereof.

23. The structure of claim 21, wherein at least one of the first and second density layers includes machined surfaces.

24. The structure of claim 22, wherein at least one of the first, second, and third density layers includes machined surfaces.

25. The structure of claim 21, wherein at least one of the first and second density layers is in an expanded state in the expansion direction.

26. The structure of claim 22, wherein at least one of the first, second, and third density layers is in an expanded state in the expansion direction.

27. The structure of claim 23, wherein at least one of the first and second density layers are is an expanded state in the expansion direction.

28. The structure of claim 24, wherein at least one of the first, second, and third density layers are is an expanded state in the expansion direction.

29. A continuous multi-strength honeycomb structure without splices, said structure comprising:

a first portion having first layers of a first thickness flexible substrate, pairs of said first layers are connected at portions transverse to an expansion direction of said first portion, at a first interval and staggered between pairs of said first layers so as to form a first expandable honeycomb structure; and a second portion having second layers of a second thickness flexible substrate, pairs of said second layers are connected at portions transverse to an expansion direction of said second portion, at a second interval and staggered between pairs of said layers so as to form a second expandable honeycomb structure continuous with said first expandable honeycomb structure, wherein said first and second portions have respective first and second densities and form a continuous multi-strength honeycomb structure without splices, and said layers of said first and second portions are perpendicular to said expansion direction thereof.

30. The structure of claim 29, further comprising:

a third portion having third layers of a third thickness flexible substrate, pairs of said third layers are connected at portions transverse to an expansion direction of said third portion, at a third interval and staggered between pairs of said layers so as to form a third expandable honeycomb structure continuous with one of said first and second expandable honeycomb structures, wherein said first, second, and third portions have respective first, second and third densities and form a continuous multi-strength honeycomb structure without splices, and said layers of said first, second and third portions are perpendicular to said expansion direction thereof.

31. The structure of claim 29, wherein at least one of said first and second portions includes machined surfaces.

32. The structure of claim 30, wherein at least one of said first, second, and third portions includes machined surfaces.

33. The structure of claim 29, wherein at least one of said first and second portions is in an expanded state in said expansion direction.

34. The structure of claim 30, wherein at least one of said first, second, and third portions is in an expanded state in said expansion direction.

35. The structure of claim 31, wherein at least one of said first and second portions is in an expanded state in said expansion direction.

36. The structure of claim 32, wherein at least one of said first, second, and third portions is in an expanded state in said expansion direction.

* * * * *